United States Patent
Farrell et al.

(10) Patent No.: US 6,866,458 B2
(45) Date of Patent: Mar. 15, 2005

(54) DRYWALL FASTENER WITH IMPROVED DRIVING HEAD

(75) Inventors: Mark A. Farrell, Conroe, TX (US); Michael E. Farrell, Murrieta, CA (US)

(73) Assignee: Evening Star International, Inc., Conroe, TX (US)

( * ) Notice: Subject to any disclaimer, the term of this patent is extended or adjusted under 35 U.S.C. 154(b) by 0 days.

(21) Appl. No.: 10/393,866

(22) Filed: Mar. 21, 2003

(65) Prior Publication Data

US 2003/0161702 A1 Aug. 28, 2003

Related U.S. Application Data

(63) Continuation-in-part of application No. 09/724,333, filed on Nov. 28, 2000.

(51) Int. Cl.[7] ................................................ F16B 15/00
(52) U.S. Cl. ..................... 411/477; 411/462; 411/463
(58) Field of Search ........................... 411/477, 478, 411/493, 494, 485, 473, 923, 462, 463, 466, 467

(56) References Cited

U.S. PATENT DOCUMENTS

| | | | | |
|---|---|---|---|---|
| 441,227 A | * | 11/1890 | Cary | .................... 217/70 |
| 778,809 A | * | 12/1904 | Stokes | .................... 411/467 |
| 1,338,988 A | | 5/1920 | Kinoshita | |
| 1,412,186 A | * | 4/1922 | Limerick | ............... 411/477 |
| 1,934,134 A | | 11/1933 | McChesney | |
| 2,155,893 A | | 4/1939 | Fulton | |
| 2,319,058 A | | 5/1943 | Hansman | |
| 2,382,474 A | | 8/1945 | Gambo | |
| 2,564,643 A | | 8/1951 | Hall | |
| 2,740,505 A | | 4/1956 | Flora | |
| 2,751,052 A | | 6/1956 | Flora | |
| 3,295,405 A | * | 1/1967 | Burke | ................... 411/467 |
| 3,882,755 A | | 5/1975 | Enstrom | |
| 3,973,295 A | | 8/1976 | Janke | |
| 3,983,779 A | | 10/1976 | Dimas | |
| 4,078,308 A | * | 3/1978 | Becker | .................. 30/299 |
| 4,641,472 A | * | 2/1987 | Young et al. | ............ 52/361 |

* cited by examiner

*Primary Examiner*—Flemming Saether
(74) *Attorney, Agent, or Firm*—Fulbright & Jaworski L.L.P.

(57) ABSTRACT

A fastener for securing a drywall work piece to a metal substrate. The fastener includes an elongated flat body carrying a securing member and having a driving head disposed at a substantially right angle to the elongated flat body. The driving head defines a bore therein surrounded by a downwardly directed flange having a distal cutting edge which cuts the top paper laminate of the drywall allowing the head to countersink into the drywall without damaging the top paper laminate.

7 Claims, 4 Drawing Sheets

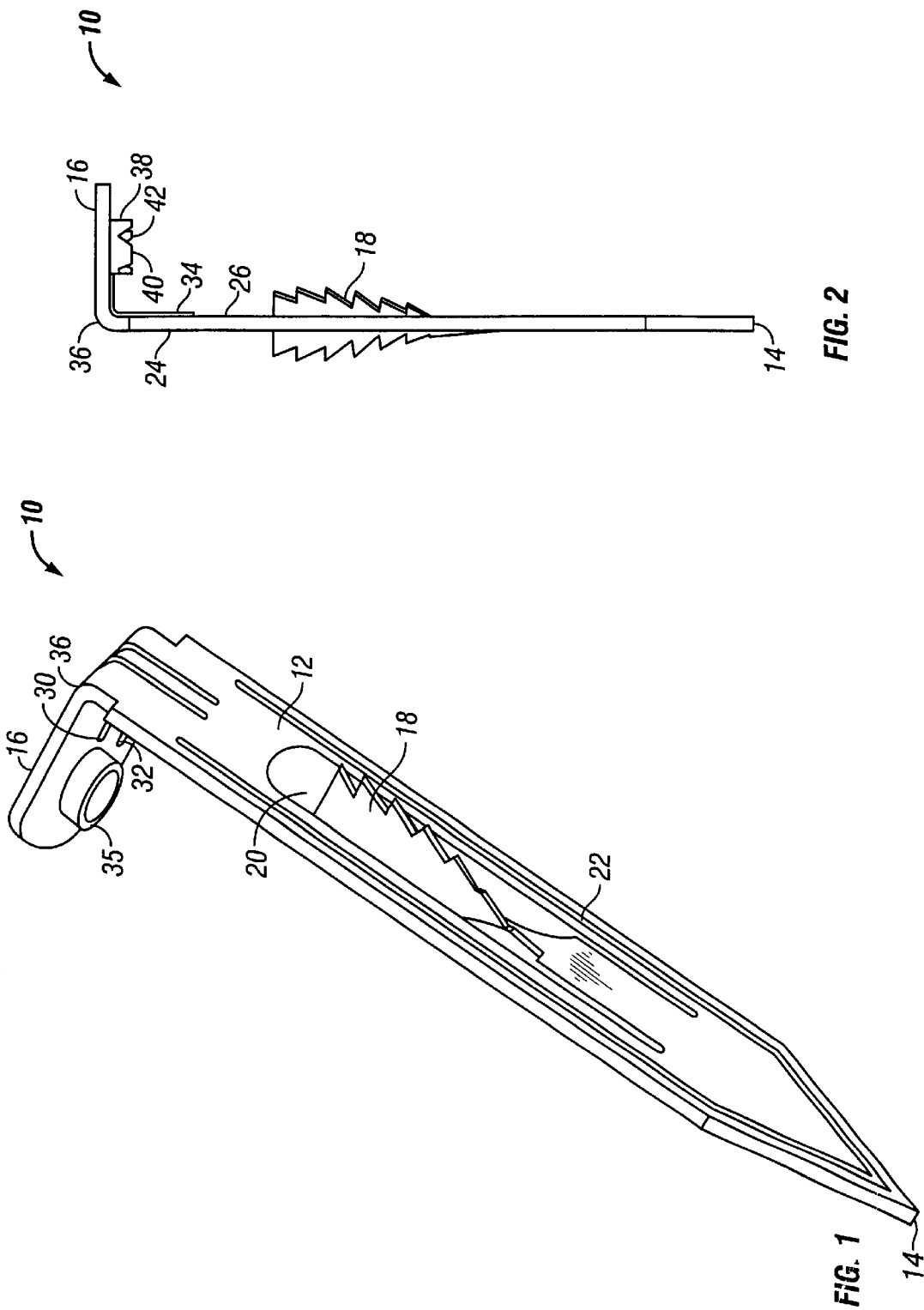

DRYWALL FASTENER WITH IMPROVED DRIVING HEAD

RELATED APPLICATION

This application is a continuation-in-part of application Ser. No. 09/724,333 which was filed on Nov. 28, 2000 for "METAL PIERCING FASTENER" by Applicants of this application and assigned to the assignee of this application.

FIELD OF THE INVENTION

The present invention relates generally to fasteners and more particularly to a metal piercing fastener for securing a drywall work piece to at least one metal substrate and retaining the secured layers in their positions permanently under adverse conditions.

BACKGROUND OF THE INVENTION

Fasteners for attachment of drywall (gypsum board) to a metal substrate are, generally helically threaded round screw bodies or round nail shanks (center shanks). The center shanks of these type fasteners penetrate the top paper of the drywall paper-gypsum-paper laminate then the head countersinks into the top paper laminate to such a distance as to be flush or slightly below flush with the top surface. It is necessary for ultimate strength of drywall board fastening that the top paper laminate not be cut around the perimeter of the head. If this situation occurs it is not within building code specifications.

It has been discovered that the central shank of both types of conventional fasteners used for this application (screws and nails) cut this top paper laminate. This is obvious, but what is not obvious is that this allows the paper to stretch as the head countersinks. It is this stretching of the paper that allows the head perimeter to countersink into the gypsum without cutting through the top paper laminate. Additionally, the head of these fasteners are rounded on their edges to eliminate a sharp edge.

With current fasteners, heads are of either a cupped shape (nails) or are flat across the top while incorporating a driving recess (screws). The need for the cupped head for nails is to provide a reservoir to hold top finish coats (generally plaster). For screws, this reservoir is provided by the driving recess. The need for depression is to create an unequal mass in the fastener middle to hold the finish coat in place. The finish coat easily adheres to the paper along the perimeter of the fastener head. However, if the complete span of the head were flat without depression, the resulting finish coat would easily break-away with the slightest pressure. The problem with these depressions is that they hold an unequal mass of finish coat. As the water-based coating dries, the perimeter dries faster than the middle mass, this due to, in major part, the absorbtion characteristics of the top paper laminate. Drying time means waiting time for the installer to sand and finish the product. Unequal drying time means cracking in the finish coat in the middle, large mass area.

The present invention incorporates a structure to allow a fastener including an elongated flat body having a driving head disposed to one side thereof to properly countersink without tearing the top paper laminate and to allow for a more even finish coat, faster drying time and substantial reduction in cracking of the finish coat. Prior art patents to Flora (U.S. Pat. No. 2,751,052); Gombo (U.S. Pat. No. 2,382,474); Janke (U.S. Pat. No. 3,973,295); Enstrom (U.S. Pat. No. 3,882,755) and Fulton (U.S. Pat. No. 2,155,893) each disclose generally an "L" shaped fastener as above described but none deal with the problem of allowing the head to properly countersink into drywall.

SUMMARY OF THE INVENTION

A fastener for securing drywall having a paper laminate to a metal substrate includes an elongated flat body including a point for penetrating the drywall and the metal substrate and has a securing member carried by the body, a head is disposed at a substantially right angle to the body for use in driving the fastener through the work piece and through the substrate, the head defines a downwardly depending member adapted to penetrate the paper laminate on the drywall.

BRIEF DESCRIPTION OF THE DRAWINGS

FIG. 1 is perspective view of a fastener constructed in accordance with the principles of the present invention;

FIG. 2 is a side elevational view of the fastener as shown in FIG. 1;

DETAILED DESCRIPTION

Figure 3:
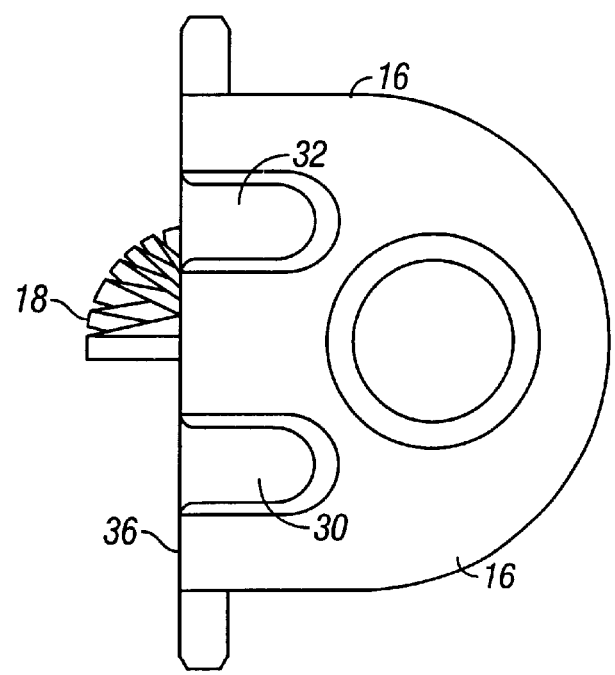
FIG. 3 is a top plan view of the fastener as shown in FIG. 2.

A fastener constructed in accordance with the present invention includes a body which penetrates both the drywall and the metal substrate with a minimum of effort. The fastener is driven through the drywall and the substrate by an appropriate power tool preferably a pneumatically operated power tool which has a work stroke such that the body of the fastener penetrates through the drywall and the metal substrate by an amount sufficient to cause the head of the fastener to be positioned substantially flush with the outer surface of the paper laminate covering the drywall. A cutting or piercing surface is provided on the head to penetrate the paper laminate on the drywall. An aperture or opening is preferably provided in the head of the fastener and a downwardly extending flange is formed surrounding the opening with the flange at its distal end defining a cutting surface or edge. The cutting surface or edge cleanly cuts through the paper laminate on the drywall thus allowing the paper laminate to stretch sufficiently to allow the head to countersink and be seated flush without tearing the paper laminate. The existence of the aperture also allows a skim or finish coat of plaster to be placed over the fastener, the finish coat of plaster attaches to the paper laminate through the aperture which in turn, causes faster drying and anchors the finish coat to the drywall thus providing a clean smooth surface for painting or other finishing as may be desired.

These and other features of the fasteners in accordance with the present invention are illustrated in the drawings to which reference is hereby made. As is shown, in FIG. 1, the fastener 10 includes an elongated body 12 having a point 14 for penetrating the drywall work piece and the metal substrate. Provided at the opposite end of the elongated body 12 is a head 16 adapted for engagement by a power tool (not shown) to drive the fastener 10 through the work piece and the metal substrate. A securing member 18 is carried by the body 12 for securing the work piece and the metallic substrate together after insertion of the fastener through the drywall and the metal substrate. Securing member 18 as illustrated in FIG. 1 is a tine which is disposed within an opening 20 formed in the body 12. The tine extends from the lower portion of the opening and protrudes upwardly into it. As is shown in FIG. 1, the tine is twisted and as it passes through the aperture formed by the point 14 it flattens into the opening 20 and does not distort the aperture dimensions. The securing member then by friction with the edges locking within the formed aperture in the metal substrate holds the work piece and the metal substrate together.

The body 12 may be coined along the edges to and including the point 14 as shown at 22. The term coined or coining means that the thickness of the metal of the body along the edges is reduced by the application of extreme pressure. The coining generates a depression or channel which extends from adjacent the head 16 down both side edges of the body to and including the point 14 but displaced slightly from the side edges of the body. Thus, coining as used in this application is intended to mean that the material on the surface 24 is compressed to form the channel as shown at 22 but in such a way that there is no protrusion of the metal of the body from the opposite surface thereof. The coining preferably is accomplished during the stamping operation which produces the fastener but may be performed separately, if desired. Such an operation work hardens the material causing it to be able to penetrate through the work piece and substrate easier without bending or otherwise deforming.

The body adjacent to and including a portion of the head has formed therein first and second stamped stiffening grooves 30 and 32. These grooves preferably, but not necessarily, overlap the upper portions of the coining channel. By the term stamped stiffening grooves, it is meant that the material of the body during the stamping operation which forms the body is deformed so that a groove is formed on the surface 24 and a protrusion is formed on the opposite surface 26 as shown at 34 on FIG. 2. Also as shown in FIG. 1 the grooves continue around the bend 36 which forms the head 16 and onto the head.

Figure 4:
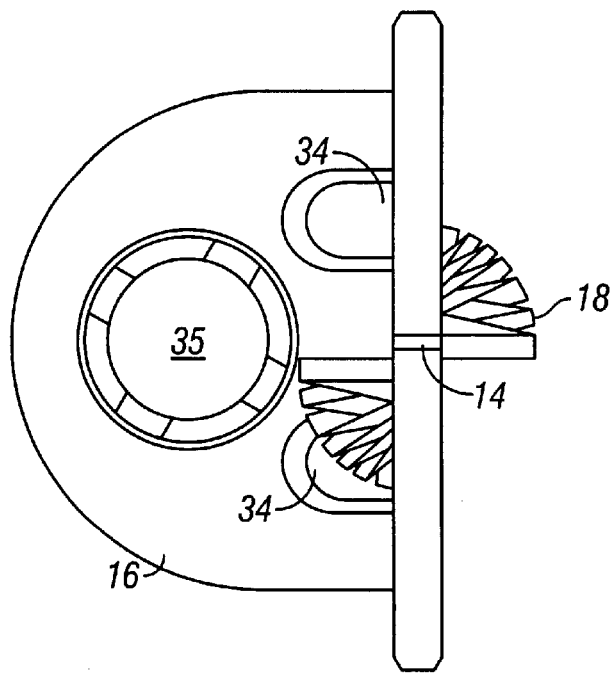
FIG. 4 is a bottom view of the fastener shown in FIG. 2.

The head 16 defines an aperture or opening 35 therein which is displaced from the bend 36 which is the transition between the body and the head. As is shown particularly in FIG. 2, there is formed about the opening 35 a downwardly depending flange 38 which is utilized to cut through the surface of the work piece, such as drywall, to facilitate the head 16 positioning itself flush with the drywall surface without damaging the same. As seen in FIGS. 1 and 2, the lower peripheral edge of the flange 38 may be smooth or irregular as will be discussed more fully below. The distal end 40 of the flange 38 is formed to have a sharp cutting edge which is preferably irregular so as to easily and clearly cut through the paper laminate on the dry wall and penetrate the drywall without tearing the paper or crushing the gypsum drywall. The cutting edge 40 may be further formed to include an irregular serration as shown at 42 on FIGS. 2, 4 and 10. The aperture exposes a portion of the drywall and allows a finish coat of plaster to adhere to the drywall thus allowing moisture disbursement and more even and faster drying without cracking.

Figure 5:
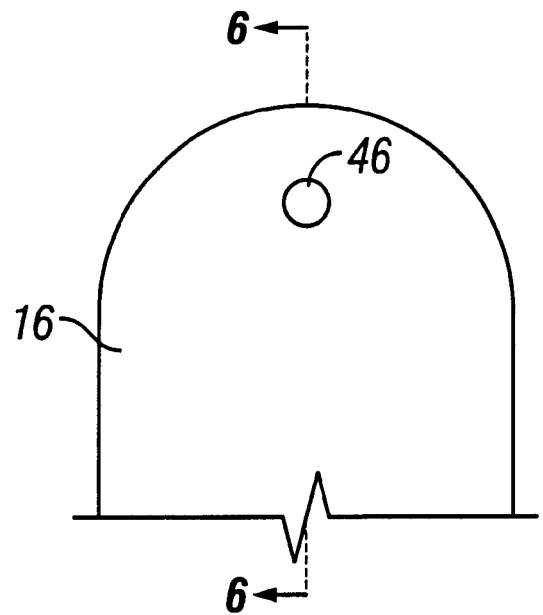
FIG. 5 is a partial plan view of the head of the fastener at a first stage of formation thereof.
Figure 6:
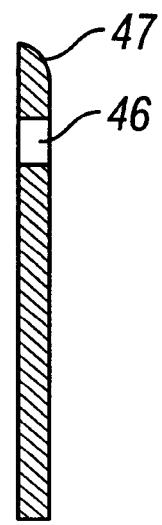
FIG. 6 is a cross-sectional view taken about the lines 6—6 at FIG. 5.
Figure 7:
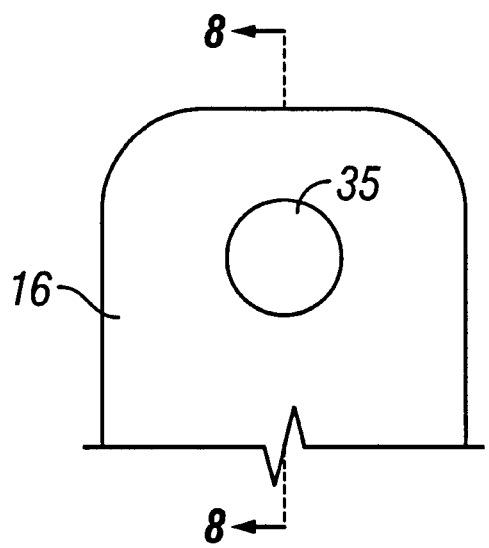
FIG. 7 is a partial plan view of the head of the fastener after formation of the opening and flange therein.
Figure 8:
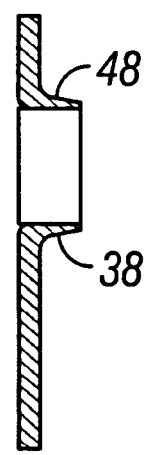
FIG. 8 is a cross-sectional view taken about the lines 8—8 of FIG. 7.
Figure 9:
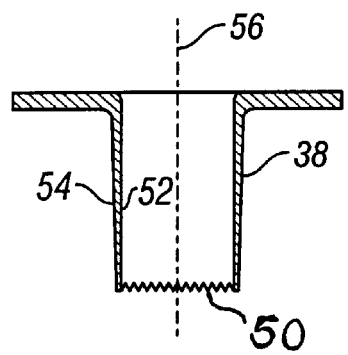
FIG. 9 is a expanded view in partial cross section of the opening and the flange on the head as shown in FIG. 8.

By reference now to FIGS. 5–10 there is illustrated the manner in which the flange 38 and the cutting edge 40 thereof is formed. As is illustrated in FIGS. 5 and 6 the head 16 has a small aperture 46 formed therein, the aperture 46 is substantially smaller than what is desired for the ultimate opening 35. It is important that the periphery of the head is formed during the stamping operation to have an upwardly curving surface profile 47. This profile eliminates sharp edges normally present in stamped objects. Sharp edges on the head would cut into the paper layer or the drywall and destroy its integrity. With the upwardly curving surface profile, the head can readily be positioned to be flush with the upper surface of the drywall without damage to the paper layer. As is shown at FIG. 6 the aperture 46 extends completely through the thickness of the metal forming the head 16. Subsequently, the opening 46 is positioned to receive extruding dies which are used in the stamping process utilized to form the fastener of the present invention. The extruding dies function so that the male member extends down toward the opening 46 and is received within a female member such that the metal material surrounding the opening 46 is caused to move downwardly or to the right as viewed in FIG. 8. In this process, the material as shown at 48 is upset or extruded between the surfaces of the male and female dies in such a manner that the material is continuously extruded to form the opening 35 and the flange 38. As illustrated in FIG. 9, the material is continuously extruded so long as such is possible so that the cutting edge 40 of the material 38 defines a very sharp and irregular edge as shown at 50. It is important to realize that it is the irregular and very sharp edge 50 which is required to readily and easily cut through the paper laminate on the drywall without tearing the paper or crushing the drywall gypsum. It should be noted that the inner and outer walls 52 and 54, respectively, of the material 38 are slanted slightly toward the center line 56 of the opening 35 formed by the extrusion process. This inward slanting of the walls 52 and 54 is necessary to permit the insertion and retraction of the extruding dies during the forming process.

Figure 10:
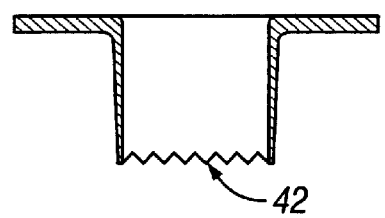
FIG. 10 is an illustration similar to FIG. 9 but showing an additional step in the formation of the cutting edge formed on the flange.

As is illustrated in FIG. 10, if desired subsequent to the extrusion forming the cutting edge 50 as shown in FIG. 9, the cutting edge may be further refined by providing irregular serrated teeth as shown at 42, although such is not required.

Figure 11:
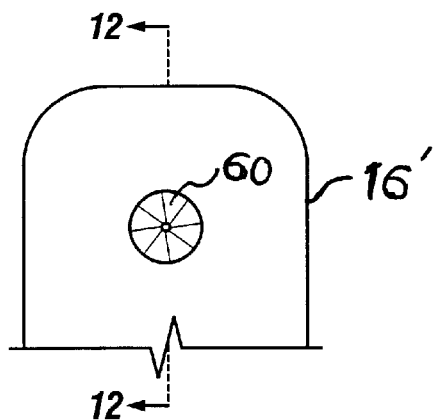
FIG. 11 is a partial plan view of an alternative embodiment of the head of a fastener constructed in accordance with the present invention.
Figure 12:
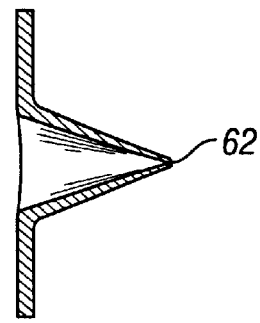
FIG. 12 is a cross-sectional view taken about the lines 12—12 of FIG. 11.

By reference to FIGS. 11 and 12 there is illustrated an alternative embodiment of the head of the fastener formed in accordance with the present invention. As is therein shown, the head 16' has a depression 60 formed therein. The depression 60 may be formed by extrusion dies similar to those used to form the flange 38 as above described. However, in this embodiment, no opening is first formed through the head 16. As a result, the material of the head is extruded or swaged to extend downwardly (as viewed in FIG. 2) to form a piercing or cutting edge or point 62. The point 62 is sufficiently sharp to easily piece or cut the paper laminate on the drywall to allow the paper laminate to stretch and permit the head to countersink and be flush with the surface of the drywall.

There has thus been disclosed a fastener for securing a drywall work piece to a metal substrate which fastener defines a downwardly directed cutting or piercing edge on the head or alternatively an opening in the head thereof which further includes a downwardly extending flange having a distal cutting surface for cutting through the paper laminate on the drywall without tearing the paper or crushing the gypsum drywall.

What is claimed is:

1. A fastener for securing a drywall work piece having a paper laminate to a metal substrate comprising:

an elongated flat body including a point for penetrating said work piece and said substrate;

a securing member carried by said body;

a head disposed at a substantially right angle to and extending from one side of said body for use in driving said fastener through said work piece and said substrate, said head defining an opening therethrough;

a downwardly depending flange formed integrally with said head surrounding said opening, said flange adapted to penetrate said paper laminate on said work piece;

said flange defining a distal surface which distal surface includes a cutting member;

a first stamped stiffening groove disposed at a transition between said body and said head and extending from said transition along said body and said head; and said body being coined adjacent to but displaced from said outer edges of said body and said stamped stiffening groove extends along said body for a distance to overlap said coining.

2. A fastener as defined in claim 1 wherein said flange is extruded from material of said head surrounding said opening.

3. A fastener as defined in claim 2 wherein said cutting member is an irregular surface.

4. A fastener as defined in claim 2 wherein said distal surface extends at least approximately 1.5–2 mm below said head.

5. A fastener as defined in claim 3 wherein said cutting member is an irregular serrated surface.

6. A fastener for securing a drywall work piece having a paper laminate to a metal substrate comprising:

an elongated flat body inluding a point for penetrating said work piece and said substrate;

a securing member carried by said body;

a head disposed at a substantially right angle to and extending from one side of said body for use in driving said fastener through said work piece and said substrate, said head defining an opening therethrough;

a downwardly depending flange formed integrally with said head surrounding said opening, said flange adapted to penetrate said paper laminate on said work piece;

said flange defining a distal surface which distal surface includes a cutting member;

a first stamped stiffening groove disposed at a transition between said body and said head and extending from said transition along said body and said head; and a second stamped stiffening groove laterally displaced from said first stamped stiffening groove.

7. A fastener for securing a drywall work piece having a paper laminate to a metal substrate comprising:

an elongated flat body including a point for penetrating said work piece and said substrate;

a securing member carried by said body;

a head disposed at a substantially right angle to and extending from one side of said body for use in driving said fastener through said work piece and said substrate, said head defining and opening therethrough;

a downwardly depending flange formed integrally with said head surrounding said opening, said flange adapted to penetrate said paper laminate on said work piece;

said flange defining a distal surface which distal surface includes a cutting member;

a first stamped stiffening groove disposed at a transition between said body and said head and extending from said transition along said body and said head;

a second stamped stiffening groove laterally displaced from said first stamped stiffening groove; and said body being coined adjacent to but displaced from said outer edges of said body and said stamped stiffening grooves extend along said body for a distance to overlap said coining.

* * * * *